US009915798B2

(12) United States Patent
Lowell et al.

(10) Patent No.: US 9,915,798 B2
(45) Date of Patent: Mar. 13, 2018

(54) DOWNHOLE CABLE WITH REDUCED DIAMETER

(71) Applicant: PRYSMIAN S.P.A., Milan (IT)

(72) Inventors: Mark Edmund Lowell, Dighton, MA (US); Edward Wiencek, Dighton, MA (US); Mark Denne, Dighton, MA (US); Matthew Bodziony, Dighton, MA (US)

(73) Assignee: PRYSMIAN S.P.A., Milan (IT)

(*) Notice: Subject to any disclaimer, the term of this patent is extended or adjusted under 35 U.S.C. 154(b) by 0 days.

(21) Appl. No.: 14/980,218

(22) Filed: Dec. 28, 2015

(65) Prior Publication Data

US 2017/0184804 A1 Jun. 29, 2017

(51) Int. Cl.
G02B 6/00 (2006.01)
G02B 6/44 (2006.01)
H01B 1/02 (2006.01)
H01B 11/18 (2006.01)
H01B 11/22 (2006.01)
H01B 7/04 (2006.01)

(52) U.S. Cl.
CPC ........... *G02B 6/4416* (2013.01); *G02B 6/443* (2013.01); *H01B 1/02* (2013.01); *H01B 7/046* (2013.01); *H01B 11/1834* (2013.01); *H01B 11/22* (2013.01)

(58) Field of Classification Search
CPC ........ G02B 6/4416; G02B 6/443; H01B 1/02; H01B 11/1834; H01B 11/22
USPC ................... 385/12, 100–101, 105–107, 110
See application file for complete search history.

(56) References Cited

U.S. PATENT DOCUMENTS

| 4,479,702 A | * | 10/1984 | Pryor | G02B 6/4488 |
| | | | | 264/1.28 |
| 5,355,128 A | * | 10/1994 | Riordan | E21B 47/0002 |
| | | | | 166/66 |
| 5,493,626 A | * | 2/1996 | Schultz | E21B 17/023 |
| | | | | 174/110 R |
| 5,892,176 A | * | 4/1999 | Findlay | E21B 17/206 |
| | | | | 174/102 R |
| 8,244,087 B2 | | 8/2012 | Sales Casals et al. | |
| 8,295,665 B2 | * | 10/2012 | Herbst | G02B 6/4416 |
| | | | | 385/101 |

(Continued)

FOREIGN PATENT DOCUMENTS

| EP | 0945876 | 9/1999 |
| WO | WO 2009/143461 | 11/2009 |
| WO | WO 2015/038150 | 3/2015 |

OTHER PUBLICATIONS

Coiled Tubing Drilling, available online at URL: http://petrowiki.org/Coiled_tubing_drilling, retrieved Dec. 22, 2015 (9 pages).

(Continued)

*Primary Examiner* — Ryan Lepisto
*Assistant Examiner* — Guy Anderson
(74) *Attorney, Agent, or Firm* — Finnegan, Henderson, Farabow, Garrett & Dunner, L.L.P.

(57) ABSTRACT

An optical/electrical cable for downhole environments includes a plurality of optical fibers disposed within an interior metal tube. An electrically conducting layer surrounds the interior metal tube, an insulation layer surrounds and contacts the electrically conducting layer, and an exterior metal tube surrounds and contacts the insulation layer.

8 Claims, 1 Drawing Sheet

(56) References Cited

U.S. PATENT DOCUMENTS

| | | | | |
|---|---|---|---|---|
| 8,369,667 B2* | 2/2013 | Rose | ............... | H01B 3/302 |
| | | | | 174/120 R |
| 8,818,153 B2* | 8/2014 | Hayashishita | ....... | G02B 6/4416 |
| | | | | 385/100 |
| 8,929,702 B2* | 1/2015 | Varkey | ................ | G02B 6/4416 |
| | | | | 385/100 |
| 8,931,549 B2* | 1/2015 | Smith | .................. | E21B 47/122 |
| | | | | 166/65.1 |
| 9,027,657 B2 | 5/2015 | Varkey | | |
| 9,074,988 B2* | 7/2015 | Jaaskelainen | .......... | G01N 21/15 |
| 2008/0289851 A1* | 11/2008 | Varkey | ................ | G02B 6/4416 |
| | | | | 174/115 |
| 2011/0311191 A1* | 12/2011 | Hayashishita | ....... | G02B 6/4416 |
| | | | | 385/101 |

OTHER PUBLICATIONS

International Search Report and Written Opinion dated Apr. 6, 2017 in corresponding International application No. PCT/IB2016/001909 (12 pages).

* cited by examiner

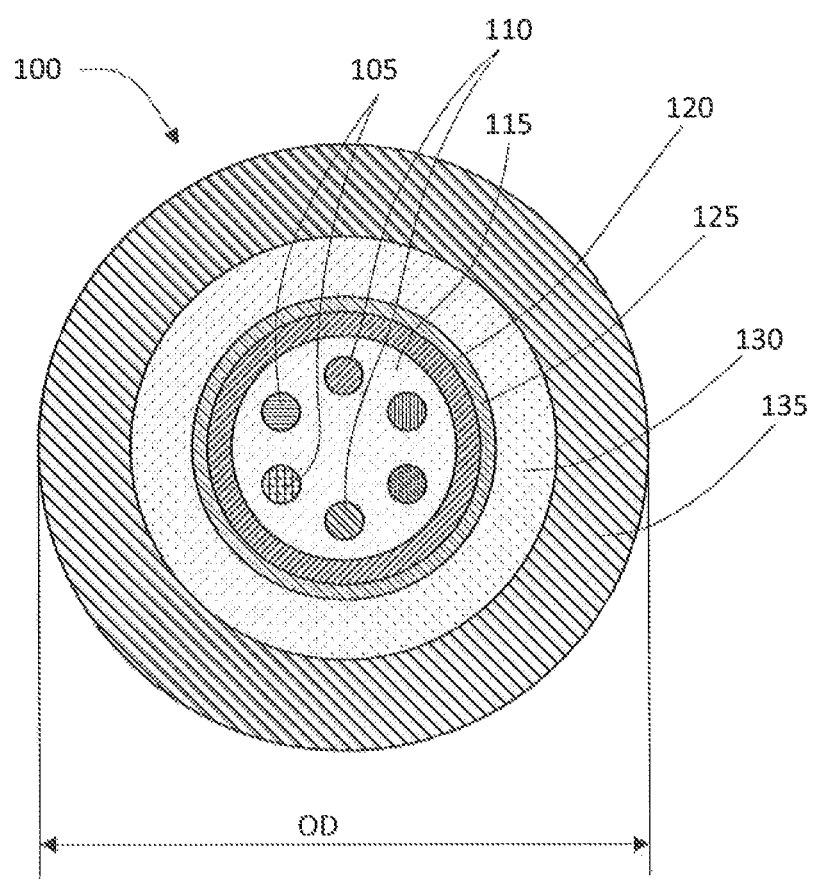

US 9,915,798 B2

DOWNHOLE CABLE WITH REDUCED DIAMETER

TECHNICAL FIELD

The present disclosure relates generally to an optical/electrical cable, and more particularly, to a cable for downhole applications having a plurality of optical fibers encased in a metal tube and an electrically conductive layer coaxially surrounding the metal tube for conducting electrical current.

BACKGROUND

Several types of cables exist for monitoring environmental conditions, sending communications and providing electrical power within a hazardous environment, such as a downhole application in an oil or gas well. One type is a "tube encased conductor" (TEC) cable. A TEC cable characteristically has an electrical conductor disposed within a metal tube for protecting the conductor from the hazardous environment. TEC cables are used for transmitting electrical power to various devices at the distal end of the cable that monitor conditions in the downhole environment, such as temperature and pressure.

Another type of cable for hazardous environments is a "tube encased fiber" (TEF) cable. Similar to TEC cables, TEF cables protect an optical fiber from the environment by disposing the fiber within a small metal tube (referred to as "fiber in metal tube" or "FIMT"). TEF cables may be used in oil and gas wells either as fiber waveguides to transfer data from downhole tools or as sensors for distributed temperature sensing (DTS distributed acoustical sensing (DAS), and other sensing applications.

When the cable contains both electrical conductors and optical fibers encased in one or more tubes, the cable is referred to as a TEC/TEF cable. Commercially available TEC/TEF downhole cables can have a ¼ inch (e.g., 6.35 mm) diameter steel tube as an outer casing. It contains an insulated conductor and another steel tube encasing an optical fiber. TEC/TEF cables of ¼ inch diameter are typically used for permanent installation in an oil well.

As known from, for example, the internet site http://petrowiki.org/Coiled_tubing_drilling, coiled tubing surveys and coiled tubing drilling are also common applications for downhole cables. The term "coiled tubing" refers to a long metal tube, normally 2.5 cm to 8.25 cm in diameter, which is spooled on a large reel. The tube is used for interventions in oil and gas wells and sometimes as production tubing in depleted gas wells. The term "coiled tubing drilling" refers to a combination of coiled tubing and directional drilling (e.g., drilling non-vertical wells) using a mud motor to create a system for drilling reservoirs.

An emerging technique for coiled tubing is to profile an oil well with distributed temperature sensor (DTS) or data acquisition system (DAS) techniques using fiber optic sensors within a TEF cable. Small diameter TEF cables, i.e., cables having an outer diameter of no more than 4 mm, can be injected into the coiled tubing string before the coiled tubing is lowered into the oil or gas well.

To further enhance the well profile, electromechanical pressure sensors may be used when sensing with coiled tubing. Those sensors, however, require electrical current not provided by a TEF cable. The stainless steel tube as part of the FIMT within a TEF cable generally does not have sufficient current carrying capacity because its resistance is too high. Commercially available TEC/TEF cables, which do provide both fiber sensing and electrical current, are too large and heavy for deployment in coiled tubing with their ¼ inch (6.35 mm) diameters. Field experiences with TEF cables for coiled tubing deployments have demonstrated that the largest outer diameter for sensing cables that can be used is 4 mm.

U.S. Pat. No. 8,295,665 (the '665 patent) discloses a downhole hybrid type cable including a center fiber/gel filled stainless steel tube with a copper wire wrapped around the tube and an insulation layer around the copper wire tube. The copper wire is disposed in the helical space formed by the metal tube. The metal tube and the copper element are put into a metallic tube. The metallic tube has a ¼ inch diameter (6.35 mm).

U.S. Pat. No. 5,493,626 (the '626 patent) discloses a downhole electrical/optical instrument cable for use in a well logging system for high-pressure environments. The cable includes a single, hermetically sealed optical fiber for signaling surrounded by layers of protective material and a gel and encapsulated by a protective sheath. The sheath may be a laser-welded metal tube. A layer of electrical conductors between an optional inner insulator and an outer insulator layer surrounds the protective tube and is formed of braided copper rather than a helical "serve" of copper. A plurality of strength member strands surrounds the outer insulator layer. The strength members include an inner layer of stainless steel strands wound helically around the outer insulator layer in one direction, and an outer layer of stainless steel strands wound helically around the inner layer of strength member strands in an opposite serve or winding. The strands and the copper braid layer are conductive and can provide an electrical power supply loop. The total diameter of the cable is approximately 5.77 mm, but it can vary within a range from about 4.76 mm to about 7.94 mm.

U.S. Pat. No. 8,931,549 (the '549 patent) discloses a cable for well logging in marine-submersible and subterranean oil and gas wells. The '549 patent concludes that conventional logging cables with wrapped steel wires and solid copper conductors are not sufficient for deep offshore wells. The disclosed cable includes at least one optical fiber encapsulated in a polymeric material wherein the optical fiber cable is loosely disposed inside a beryllium alloy tube. The beryllium alloy tube, which is conductive, is encapsulated in an amorphous dielectric material, which is further encapsulated on its outer surface by an amorphous polymeric electrically conductive material. This outer layer can be zinc, tin, or other material wrapped, sputtered, or doped the surface to form a shield for both mechanical and electromagnetic effects.

PCT International Publication WO 2009/143461 (the '461 publication) discloses cables for use in a downhole environment, such as in oil or gas wells for conveying well logging tools. In particular, the '461 publication discloses a cable including a cylindrical central core preferably formed of a communication element capable of carrying data signals, such as an optical fiber, which may be encased in a protective metal tube. The cable then includes concentric layers intended to protect a polymer fiber layer in the protective tube. It is preferred that at least one, and possibly both, of inner and outer layers around the polymer fiber layer be formed of a solid electrical conductor, such as a metallic conductor. A layer inner to the polymer fiber layer may be unnecessary if the core is designed to eliminate gas, water, and corrosive migration up and down the core by adding a "water block" agent or fluid. In the event that either of the inner layer and outer layer is not formed of a metallic material, then that layer will preferably be formed of a plastic material such as polyether ethyl ketone (PEEK), or another high density polypropylene. Outer protective sheath will again preferably be formed of PEEK, or another plastic material having exceptional resistance to abrasion, temperature and invasive materials. The '461 publication discloses that cables with an outer diameter of roughly between 0.3 inch and 0.5 inch (about 7-13 mm), will benefit most from this construction.

European Patent Publication EP 0945876 (the '876 publication) discloses a hybrid cable for installation in conduits for fluid media (for example in waste water, fresh water, or gas lines), with at least one optical waveguide arranged in a protective sheath, one or more electrical conductors, and a jacket surrounding the electrical conductor and the protective sheath. In particular, the '876 publication discloses a hybrid cable with two concentric metal tubes, of which at least the external one is corrugated. An insulating layer separates the two metal tubes, and a jacket of polyethylene surrounds the external tube. The inner tube surrounds a plurality of optical fibres. In many cases, conductivity of the inner metal tube can be sufficiently achieved by coating its surface with a metal of high conductivity.

PCT International Publication WO 2015/038150 (the '150 publication) discloses a fiber optic electrical core that may be incorporated into a fiber optic slickline (application that is run over a conveyance line that is substantially below about 0.25 inches, i.e. 6.35 mm, in overall outer diameter). One or more fiber optic threads, each jacketed by a conventional polymeric buffer, may be placed within a welded steel tube in a loose fashion with a sufficiently thick electrically insulating polymer layer thereabout, and surrounded by a conductive member. The electrically conductive member may also be surrounded by an insulating polymer jacket. To complete the fiber optic slickline, the fiber optic electrical core may be surrounded by a synthetic fiber layer. Adherence between a subsequent cladding layer and the fiber synthetic layer may be enhanced by way of the intervening adherent layer. Cladding layer may be a conventional metal-based layer such as a steel jacket.

Applicant has faced the problem of providing a TEC/TEF downhole cable with minimal diameter, particularly with a diameter of no more than 4 mm suitable for coiled tubing drilling applications. Those cables need to be capable of insertion into a coiled tubing string before the coiled tubing is lowered into the oil or gas well. TEC/TEF cables designed for well logging applications are too large, typically having an outer diameter of 6.35 mm, which can be difficult to insert in a coiled tubing and for limited length (not greater than 3 km). While some TEF cables having diameters within 4 mm are known, those small-diameter TEF cables do not have electrical conductors, nor do they have sufficient current carrying capacity due to the high electrical resistance of theft stainless steel tube.

SUMMARY

To provide a sufficient current carrying capacity within the small space. Applicant provides the conductor in the form of an electrically conducting layer coaxially surrounding the metal tube that encases the optical fibers. With the coaxial design, both the conducting layer and the optical fibers can be fit within a small diameter (e.g., no more than 4 mm) cable that meets size requirements of coiled tubing drilling. The coaxially configured TEC/TEF cable contains a sufficient number of optical fibers for distributed temperature sensing (DTS) and distributed acoustic sensing (DAS) along with an electrically isolated conductive path that transmits electrical power to a downhole tool all in one outer tube having a diameter of no more than 4 mm.

Applicant has found that cables for downhole applications having a diameter of no more than 4 mm for use in coiled tubing drilling applications may be attained with a cable structure in which optical fibers are encased in a welded metal tube, an electrically conducting layer is disposed coaxially around the metal tube, an insulating layer surrounds the electrically conducting layer, and an outer metal tube surrounds the insulating layer.

The term "coaxial" used herein refers to the configuration where an axis of symmetry of an inner tube or layer is substantially the same as an axis of symmetry of an outer tube or layer.

Applicant has found that this coaxial configuration can reduce the outer diameter of the cables, such that the cables can meet size requirements for coiled tubing drilling applications, while also providing sufficient current carrying capacity for electronic equipment at the distal end of the cable. Simultaneously, the cable includes one or more optical fibers configured for data communication and/or measurement or sensing of environmental parameters, such as temperature, pressure, strain, etc. The optical fibers are disposed within a metal tube (e.g., FIMT).

Applicant has found that the cable with a reduced diameter can provide sufficient current capacity with an electrically conducting layer (also referred to as a conducting layer or conductive layer) in the form of a tape (e.g., wrapped tape), longitudinally welded foil, or tube. The conducting layer may include a single layer or a plurality of layers. The conducting layer wraps around the metal tube that encases the optical fibers, and hence is coaxial to the metal tube.

The conducting layer is surrounded by and in direct contact with an electrically insulating layer (also referred to as an insulating layer or insulation layer). The insulation layer is in turn surrounded by an outer metal tube. The coaxially disposed conducting layer and FIMT, as opposed to discrete electrical conductors or thick copper braids, allows for the reduction of the total diameter of a standard 6.35 mm TEC/TEF cable down to an overall diameter of about 4 mm, or possibly smaller if a lower current carrying capacity is sufficient. In addition, Applicant has identified that a cable with the disclosed structure avoids the need to strand the FIMT and a conductor, simplifying the manufacturing process.

Accordingly, in one aspect, an optical/electrical cable for downhole environments consistent with the disclosed embodiments comprises a plurality of optical fibers optionally embedded in a gel and disposed within a first interior metal tube (also referred to as a first metal tube or an interior metal tube). The cable also includes an electrically conducting layer surrounding the first metal tube. An insulation layer surrounds and contacts the electrically conducting layer, and a second exterior metal tube (also referred to as a second metal tube or an exterior metal tube) surrounds and contacts the insulation layer. The exterior metal tube has an outer diameter of 4.0 mm at most.

In some embodiments, the interior metal tube has an outer diameter of about 1.8 mm. It can be made of stainless steel. In some embodiments, the exterior metal tube has a thickness of about 0.56 mm. It can be made of a steel alloy. The interior metal tube and the electrically conducting layer can have a combined thickness of about 0.28 mm.

In some embodiments, the electrically conducting layer in the form of a tape is helically wound or cylindrically wrapped around the first metal tube. In some embodiments, the electrically conducting layer includes copper. In some embodiments, the electrically conducting layer is in the form of a tube made of copper. In some embodiments, the electrically conducting layer is a foil formed into a copper tube and longitudinally welded along its seam. The electrically conducting layer can have an outer diameter of about 2.05 mm.

A separating layer can be provided between the electrically conducting layer and the first metal tube. The separating layer can be a polyethylene terephthalate tape.

In some embodiments, the insulation layer includes at least one of polypropylene, fluorinated ethylene propylene (FEP), perfluoroalkoxy (PFA), Ethylene ChloroTriFluoro-Ethylene (ECTFE), Epitaxial Co-Crystallized Alloy (ECA).

In another aspect, a TEC/TEF cable with a coaxial construction includes an exterior metal tube, an insulator, a layered tubular conductor, and a plurality of optical fibers. The exterior metal tube can have an outer diameter of no more than 4.0 mm and a thickness sufficient to protect the interior of the tube from external environmental conditions in a downhole. The layered tubular conductor comprises the electrically conducting layer surrounding and in direct contact with the interior metal tube, where the electrically conducting layer has an electrical conductivity higher than the interior metal tube. The layered conductor can have a thickness of about 0.28 mm. The layered conductor advantageously has a composition sufficient to conduct up to 1 ampere of current at 600 volts or less. The insulator separates the layered tubular conductor from the exterior metal tube. The optical fibers are housed within the interior metal tube.

The optical fibers can perform as optical sensors or as communication optical fibers. The interior metal tube can house together both one or more optical fibers performing as an optical sensor and one or more optical fibers performing as a communication optical fiber.

For the purpose of the present description and of the appended claims, except where otherwise indicated, all numbers expressing amounts, quantities, percentages, and so forth, are to be understood as being modified in all instances by the term "about," if not already modified. Also, all ranges include any combination of the maximum and minimum points disclosed and include any intermediate ranges therein, which may or may not be specifically enumerated herein.

BRIEF DESCRIPTION OF THE DRAWINGS

The disclosed embodiments will be now described more fully hereinafter with reference to the accompanying drawing, in which some, but not all embodiments of the invention are shown. The drawing illustrating the embodiment is a not-to-scale schematic representation.

The sole FIGURE shows a schematic cross-sectional view of a cable, consistent with disclosed embodiment.

DESCRIPTION OF THE EMBODIMENTS

Reference will now be made in detail to the present exemplary embodiments, examples of which are illustrated in the accompanying drawing. The present disclosure, however, may be embodied in many different forms and should not be construed as limited to the embodiments set forth herein.

The sole FIGURE illustrates a cross-sectional view of an optical/electrical cable or TEC/TEF cable 100, consistent with the disclosed embodiment. Cable 100 is suitable for downhole applications, such as coiled tubing drilling, in the oil and gas industry. Cable 100 is a TEC/TEF cable that includes both optical fibers to function as sensors of environmental parameters and/or to transmit data, and an electrical conductor to transmit power to devices in the oil and gas wells.

Cable 100 includes at least one optical fiber for sensing and/or data transmission. The example shown in the FIGURE includes two optical fibers 105 and two optical fibers 110, along with other optical fibers that are not referenced. Optical fibers 105 and 110 may be any suitable optical fibers depending on the temperature rating of cable 100 for downhole applications. Optical fibers 105 and 110 may be the same type of optical fibers, or different types of optical fibers. In the example shown in the FIGURE, two optical fibers 105 are acrylate coated 50/125 85° C. optical fibers, colored blue and orange (different patterns are used for the cross sections of the fibers to schematically represent different colors in the FIGURE). Two optical fibers 110 are acrylate coated single mode 85° C. optical fibers, colored green and brown (different patterns are used for the cross sections of the fibers to schematically represent different colors in the FIGURE).

At least one of optical fibers 105 and 110 functions for sensing an environmental parameter in an oil and/or gas well. Environmental parameters may include temperature, pressure, and/or acoustical measurements. At least one of optical fibers 105 and 110 functions to provide data transmission between other sensors or devices deployed down the well, and a data receiving device (e.g., a computer, a data storage device, a monitor display, a signal processor, etc.) deployed outside of the well.

The optical fibers are disposed within an inner space defined by a first interior metal tube 120 (also referred to as an interior metal tube 120 or a first metal tube 120). The space is filled with a gel 115. The optical fibers 105 and 110 are embedded within the gel 115. The combination of the optical fibers 105, 110, the gel 115, and the first metal tube 120 may be referred to as a unit called FIMT (fiber in metal tube). In some embodiments, the outer diameter of the FIMT unit may be 2.2 mm.

The gel 115 is any type of gel suitable for the temperature rating of cable 100 for downhole applications. The gel 115 may be an inert gel that is injected into the space defined by the first metal tube 120, filling the space around the optical fibers including optical fibers 105 and 110. The gel 115 may fix the optical fibers in their positions, and support the optical fibers within the first metal tube 120. The gel 115 may also functions to mitigate or reduce vibration, shock, friction, and abrasion caused by the external environment to the optical fibers. The gel 115 may be a viscous material. One example of the gel 115 for filling the optical fibers is Sepigel™ produced by SEPPIC SA., used with an excess fiber length (EFL) of 0.15%+/−0.05%.

In some embodiments, the first metal tube 120 may be made of any suitable metal material, such as steel, copper, aluminum, etc. A variety of materials, including steels and alloys, may be used to make the first metal tube 120. Examples of such materials include SS 304, SS 316L, A825, and A625. In one example, the first metal tube 120 is made of stainless steel SS 304, with a wall thickness of 0.15 mm (or 0.006 inch), and an outer diameter of 1.8 mm (or 0.071 inch).

As shown in the FIGURE, cable 100 includes an electrically conducting layer 125. The electrically conducting layer 125 includes at least one conductor configured for electrical power transmission. The conductor may be made of any electrically conductive material, such as copper or tinned copper. Preferably, the electrically conductive material has a higher conductivity than the material of the first metal tube 120, e.g. copper versus stainless steel. Other conductive materials that can be used for the conducting layer 125 include aluminum, gold, silver, etc. The conductor may have any suitable form or shape, such as wire, mesh, tape, tube, strip, etc.

The electrically conducting layer 125 is helically wound around an outer surface of the first metal tube 120, or is cylindrically wrapped around the outer surface of the first metal tube 120. The electrically conducting layer 125 may directly contact the outer surface of the first metal tube 120, or may indirectly contact the outer surface of the first metal tube 120 with an additional layer, such as insulation layer, disposed between the outer surface of the first metal tube 120 and the electrically conducting layer 125.

In some embodiments, the electrically conducting layer 125 is in the form of a tape helically wound on the outer surface of the first metal tube 120. For example, the electrically conducting layer 125 may be metal strips that are helically wound on the outer surface of the first metal tube 120.

In some embodiments, the electrically conducting layer 125 is cylindrically wrapped around the outer surface of the first metal tube 120. For example, the electrically conducting layer 125 may be applied as a foil longitudinally wrapped to surround the outer surface of the first metal tube 120. Or the electrically conducting layer 125 may be in the form of a tube welded foil. In some embodiments, the electrically conducting layer 125 may be a seam welded tube (e.g., a seam welded copper tube). For example, the seam welded tube may have a thickness of 0.127 mm (or 0.005 inch) and an outer diameter of 2.05 mm (or 0.081 in). When a seam welded tube is used, the FIMT unit may be made smaller than with other configurations for the electrically conducting layer 125. Thus, the use of a seam welded tube may permit an increase in the cable's electrical conductivity and allow for a thicker insulation layer (discussed below) to be used.

The electrically conducting layer 125 may take other forms. For example, the electrically conducting layer 125 may be a continuously welded tube, an extruded metal tube, a braided wire layer, a helically applied layer of fine wires, or any other concentrically applied layer of metal.

The electrically conducting layer 125 is coaxial with the first metal tube 120. That is, the axis of symmetry of the electrically conducting layer 125 is the same as the axis of symmetry of the first metal tube 120. The electrically conducting layer 125 forms the primary conductive path for power transmission. When an inner surface of the electrically conducting layer 125 directly contacts the outer surface of the first metal tube 120, the first metal tube 120 may also carry a small amount of the total current when the resistance of the material for making the first metal tube 120 (e.g. steel) is higher than the resistance of the material for making the electrically conducting layer 125 (e.g., copper).

Therefore, the combination of the interior metal tube and the electrically conducting layer may form a layered tubular conductor for the cable. One layer of the conductor, namely, electrically conducting layer 125 made, for example, of copper, has a higher conductivity than other layers, namely, the interior metal tube 120 made, for example, of stainless steel. Preferably, the layered tubular conductor should have the capacity through its material composition and layer thicknesses to conduct up to 1 ampere of current at 600 volts or less.

Cable 100 also includes an electrical insulation layer 130 coaxially surrounding an outer surface of the electrically conducting layer 125. An inner surface of the insulation layer 130 directly contacts an outer surface of the electrically conducting layer 125. The insulation layer 130 electrically insulates the electrically conducting layer 125 from the outer environment. Materials used for the insulation layer 130 depend on the cable temperature rating. Examples of the materials for making the insulation layer 130 include polypropylene, fluorinated ethylene propylene (FEP), perfluoroalkoxy (PFA), Ethylene ChloroTriFluoroEthylene (ECTFE), Epitaxial Co-Crystallized Alloy (ECA). In one example, the insulation layer is made of natural FEP and has an outer diameter of 2.79 mm (or 0.110 inch). The minimum and nominal thickness of the insulation layer can be calculated by the skilled person in view of the cable voltage rating.

Cable 100 includes a second exterior metal tube 135 (also referred to as a second metal tube 135 or an exterior metal tube 135) coaxially surrounding an outer surface of the insulation layer 130. An inner surface of the second exterior metal tube 135 may directly contact an outer surface of the insulation layer 130. The second metal tube 135 may be made of any suitable metal material, preferably steel or steel alloy. For example, a variety of steels and alloys may be used to make the second metal tube 135, such as SS 304, SS 316L, A825, and A625. As shown in the FIGURE, the second metal tube 135 is a single tube coaxially surrounding the outer surface of the insulation layer 130. In one example, the second metal tube 135 is made of alloy A825 with a wall thickness of 0.55 mm (or 0.022 inch), and an outer diameter (OD in the FIGURE) of 4 mm (or 0.1575 inch).

The outer diameter of the second metal tube 135 (i.e., the total diameter of the cable 100) is 4 mm at most. The outer diameter is substantially the same as the total diameter of the cable 100. Thus, the total diameter of the cable 100 is no more than 4 mm. In some embodiments, when lower currents are needed or thinner tubes (e.g., first metal tube 120, second metal tube 135) are possible, the total diameter of the cable 100 may be reduced to be less than 4 mm. It is also possible to have an outer diameter greater than 4 mm, although such an embodiment may be limited in its applications for cable tubing sensing in a downhole environment. In the case, the second metal tube can perform as return or ground conductor without any specific modification to its design.

In radial outer position with respect to the second metal tube, a protective jacket (not illustrated) can be provided. The protective jacket can be made of polymeric material such as polyethylene, preferably high density polyethylene.

The disclosed cable has an electrically isolated conductive path with a low voltage of 600 volts DC or less (e.g., 500 volts DC), and can carry a current of 1 ampere. The disclosed cable can be used for a continuous length of 5 kilometer (km) or longer. In some embodiments, the disclosed cable can tolerate a maximum temperature of 300° C. The disclosed cable has a temperature rating of 175° C. (short term) and 150° C. (long term). In some embodiments, the disclosed cable can have an external collapse pressure of 28,900 psi (or about $2.0 \times 10^8$ Pa) and a cable weight of 71 kg/km (or 48 lbs/1000 ft). The disclosed cable can have a DC resistance of 21.9 ohms/km (or 6.66 ohms/1000 ft) at 20° C. for a seam welded copper tube as the electrically conducting layer 125 and a stainless steel tube for FIMT 120.

The optical fibers within the cable can function as sensing fibers and as communication fibers. In some embodiments, the attenuation is ≤3.5 dB/km for multimode at 850 nm, 1.5 dB/km for multimode at 1300 nm. The attenuation is ≤0.7 dB/km for single mode at 1310 nm, and ≤0.7 dB/km for single mode at 1550 nm.

The disclosed cable can meet typical downhole application requirements, such as, for example, maximum pressure of $6.89 \times 10^7$ Pa (or 10,000 psi), and maximum temperature of 150° C.

The disclosed cable can be used as a lower profile "heatable" fiber optic sensing cable. The term "heatable" downhole cables refers to a technique where electrical conductors are heated for a temporary period and the cooling rate is monitored by the optical fibers to calculate the thermal properties surrounding the TEC/TEF cable.

The disclosed cable can be used in a variety of industrial applications, such as oil and gas downhole surveys, oil and gas downhole permanent installations, and non-oil and gas downhole sensing applications such as geothermal energy or carbon dioxide sequestration monitoring.

It will be apparent to those skilled in the art that various modifications and variations can be made to the structure of the cable disclosed herein without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical/electrical cable for downhole environments, comprising a plurality of optical fibers disposed within an interior metal tube; an electrically conducting layer surrounding the interior metal tube; an insulation layer surrounding and contacting the electrically conducting layer; and an exterior metal tube surrounding and contacting the insulation layer, wherein the interior metal tube is coaxial with the exterior metal tube and wherein the exterior metal tube has an outer diameter of less than or equal to 4.0 mm.

2. The cable according to claim 1, wherein the interior metal tube comprises stainless steel.

3. The cable according to claim 1, wherein the exterior metal tube comprises a steel alloy.

4. The cable according to claim 1, wherein the electrically conducting layer includes copper.

5. The cable according to claim 1, wherein a separating layer is provided between the electrically conducting layer and the interior metal tube.

6. The cable according to claim 1, wherein the optical fibers are embedded in a gel.

7. The cable according to claim 1, wherein the optical fibers perform as optical sensor or as communication optical fiber, and the interior metal tube houses together optical fibers performing as optical sensor and optical fibers performing as communication optical fiber.

8. A hybrid cable with a coaxial construction, comprising:
an exterior metal tube;
a layered tubular conductor positioned coaxially within the exterior metal tube, comprising an electrically conducting layer surrounding and in direct contact with an interior metal tube, where the electrically conducting layer has an electrical conductivity higher than the interior metal tube;
an insulator separating the layered tubular conductor from the exterior metal tube; and
optical fibers housed within the interior metal tube,
wherein the interior metal tube is coaxial with the exterior metal tube and wherein the exterior metal tube has an outer diameter of less than or equal to 4.0 mm.

* * * * *